(12) United States Patent
Zhang et al.

(10) Patent No.: US 11,882,460 B2
(45) Date of Patent: Jan. 23, 2024

(54) APPARATUSES AND METHODS TO DETERMINE A HIGH-RESOLUTION QOS PREDICTION MAP

(71) Applicant: Robert Bosch GmbH, Stuttgart (DE)

(72) Inventors: Dan Zhang, Leonberg (DE); Jens Schwardmann, Hildesheim (DE)

(73) Assignee: Robert Bosch GmbH, Stuttgart (DE)

(*) Notice: Subject to any disclaimer, the term of this patent is extended or adjusted under 35 U.S.C. 154(b) by 255 days.

(21) Appl. No.: 17/521,843

(22) Filed: Nov. 8, 2021

(65) Prior Publication Data

US 2022/0159486 A1    May 19, 2022

(30) Foreign Application Priority Data

Nov. 13, 2020   (EP) .................................... 20207355

(51) Int. Cl.
*G06N 3/04* (2023.01)
*G06T 3/40* (2006.01)
(Continued)

(52) U.S. Cl.
CPC ............... *H04W 16/22* (2013.01); *G06N 3/04* (2013.01); *G06T 3/4053* (2013.01); (Continued)

(58) Field of Classification Search
CPC ........ G06N 3/02–105; G06N 20/00–20; G06T 3/40–4092; G06T 2207/20–20016; H04B 17/0082–3913; H04L 41/14–16; H04L 43/02–55; H04W 8/18–245; H04W 16/18–225; H04W 24/02–10; H04W 28/02–26; H04W 64/003–006;
(Continued)

(56) References Cited

U.S. PATENT DOCUMENTS 10,039,016 B1    7/2018 Larish et al.
2019/0150006 A1  5/2019 Yang et al.

OTHER PUBLICATIONS

Radi et al., "Applying Artifical Neural Network Hadron—Hadron Collisions at LHC", Chapter 9, INTECH, 2013, pp. 183-201.
(Continued)

*Primary Examiner* — Timothy J Weidner
(74) *Attorney, Agent, or Firm* — Michael Best & Friedrich LLP (57) ABSTRACT

An apparatus (100) for determining a high-resolution QoS prediction map for a first radio communications network of a first environment is provided. The apparatus (100) comprises: a first input unit being configured to determine or provide environment information characterizing the first environment; a second input being configured to determine or provide a low-resolution QoS map associated with the first radio communications network of the first environment or a second radio communications network of a second environment; and a determination unit being configured to propagate the low-resolution QoS map and the environment information through a trained artificial deep neural network, wherein low-resolution QoS map and the environment information are provided as input parameters in an input section of the trained artificial deep neural network, and wherein the high-resolution QoS prediction map for the first radio communications network is provided in an output section of the trained artificial deep neural network.

12 Claims, 7 Drawing Sheets

(51) Int. Cl.
- *H04B 17/391* (2015.01)
- *H04L 41/147* (2022.01)
- *H04L 41/16* (2022.01)
- *H04L 43/091* (2022.01)
- *H04L 43/55* (2022.01)
- *H04W 16/18* (2009.01)
- *H04W 16/22* (2009.01)
- *H04W 24/06* (2009.01)
- *H04W 24/10* (2009.01)
- *H04W 80/08* (2009.01)
- *H04W 84/02* (2009.01)
- *H04W 88/18* (2009.01)
- *H04W 92/02* (2009.01)

(52) U.S. Cl.
CPC ..... *H04B 17/3912* (2015.01); *H04B 17/3913* (2015.01); *H04L 41/147* (2013.01); *H04L 41/16* (2013.01); *H04L 43/091* (2022.05); *H04L 43/55* (2022.05); *H04W 16/18* (2013.01); *H04W 24/06* (2013.01); *H04W 24/10* (2013.01); *H04W 80/08* (2013.01); *H04W 84/02* (2013.01); *H04W 88/18* (2013.01); *H04W 92/02* (2013.01)

(58) Field of Classification Search
CPC ... H04W 80/02–12; H04W 84/005–22; H04W 92/02–24
See application file for complete search history.

(56) References Cited

OTHER PUBLICATIONS

Zhang et al., "ZipNet-GAN: Inferring Fine-grained Mobile Traffic Patterns via a Generative Adversarial Neural Network", arXiv, 2017, 13 pages.

APPARATUSES AND METHODS TO DETERMINE A HIGH-RESOLUTION QOS PREDICTION MAP

BACKGROUND OF THE INVENTION

The description relates to enhancement for QoS prediction for radio communication networks.

SUMMARY OF THE INVENTION

The problems of the prior art are solved by an apparatus for determining a high-resolution QoS prediction map according to the invention, by a method for determining a high-resolution QoS prediction map according to the invention, by an apparatus to train a neural network according to the invention, by a method to train a neural network according to the invention, and by a use of the former apparatuses or methods according to the invention.

A first aspect of the description is directed to an apparatus for determining a high-resolution QoS prediction map for a first radio communications network of a first environment, wherein the apparatus comprises: a first input unit being configured to determine or provide environment information characterizing the first environment; a second input being configured to determine or provide a low-resolution QoS map associated with the first radio communications network of the first environment or a second radio communications network of a second environment; and a determination unit being configured to propagate the low-resolution QoS map and the environment information through a trained artificial deep neural network, wherein low-resolution QoS map and the environment information are provided as input parameters in an input section of the trained artificial deep neural network, and wherein the high-resolution QoS prediction map for the first radio communications network is provided in an output section of the trained artificial deep neural network.

The QoS prediction map provides improved fine-grained QoS predictions for mobile traffic applications. These fine-grained QoS predictions represent a reliable cellular coverage map for the first radio communications network. By considering the environment information, the artificial neural network allows to transfer coarse measurements of another network or the same network, the second radio communications network, and a fine-grained representation of the prediction associated with the first radio communications network. Moreover, the available related environmental information such as high definition maps, base station locations can be exploited for accomplishing the task. In other words, the determination unit exploits a correlation between coverage maps and the environment information such as geographic properties and infrastructure properties for enhancing the resolution of coverage maps. The determination unit solves a translation task, namely, translating the low-resolution map of region A in the sense of low-resolution QoS map to the high-resolution map of a different region B in the sense of the high-resolution QoS prediction map.

Advantageously, comprehensive maps of data rates or other quality of service parameters for the first radio communications network are created with little or without data rate measurements of the first radio communications network. The trained artificial neural network makes the translation from low-resolution to high-resolution dependent of the environment information. The trained model is able to take the low-resolution map from region A together with the environment information from region B, and then create a high-resolution map for region B, which may have neither low-resolution nor high-resolution coverage measurements available.

According to an advantageous example, the apparatus comprises: a third input unit being configured to determine or provide measurement information characterizing at least one radio channel of the first radio communications network; and the determination unit being configured to propagate the low-resolution QoS map, the environment information and the measurement information through the trained artificial deep neural network, wherein the low-resolution QoS map, the environment information and the measurement information are provided as the input parameters in the input section of the trained artificial deep neural network, and wherein the high-resolution QoS prediction map for the first radio communications network is provided in the output section of the trained artificial deep neural network.

Advantageously, sparse measurements representing a part of the present radio communication of the first radio communications network allow determining a more precise estimate in the sense of the high-resolution QoS prediction map.

According to an advantageous example, the apparatus comprises an operating unit being configured to operate the first radio communications network in dependence on the high-resolution QoS prediction map.

Advantageously, the UEs of the first radio communications network are able to react appropriately to the predicted radio conditions via the provided high-resolution QoS map.

According to an advantageous example, the apparatus comprises an upscaling section configured to upscale the low-resolution QoS map to an up-scaled representation.

Advantageously, the upscaling section up-samples the low-resolution input into the up-scaled representation with the resolution of the high-resolution QoS prediction map. Advantageously, the upscaling section extracts spatial and temporal features of the QoS.

According to an advantageous example, the trained neural network comprises a feature extraction section configured to determine a feature map in dependence on the up-scaled representation, wherein the feature extraction section comprises at least one skipping connection between layers of the feature extraction section.

Advantageously, the feature extraction section extracts features based on the up-scaled version of the low-resolution map. The skipping connections provide shortcuts in order to accelerate determination.

According to an advantageous example, the trained neural network comprises a convolutional section configured to determine the high-resolution prediction map in dependence on the feature map determined by the feature extraction section, wherein the convolutional section does not comprise skip connections between layers of the convolutional section.

According to an advantageous example, the determination unit comprises a pre-processing unit configured to determine a randomized noise map, which can be also termed randomized low-resolution QoS, comprising a plurality of randomized noise values, configured to determine a randomized low-resolution QoS map in dependence on the determined randomized noise map and in dependence on the low-resolution QoS map, and configured to provide the randomized low-resolution QoS map to the trained artificial neural network. The randomized noise map is used to fill in the missing information from low-resolution to high-resolution.

As the transferring is not a deterministic mapping, it is controlled by a random vector, here we call it noise.

The trained network takes the given low resolution QoS map and also has some additional randomized noise input (could be at the input layer or other hidden layers), and then outputs a high-resolution QoS map. Such output varies over the noise. Hence, the stochastic relationship between the low- and high-resolution maps, which the trained artificial neural network has learned, is exploited.

According to a second aspect of the description, a method for determining a high-resolution QoS prediction map for a first radio communications network of a first environment is provided. The method comprises: determining or providing environment information characterizing the first environment; determining or providing a low-resolution QoS map associated with the first radio communications network of the first environment or with a second radio communications network of a second environment; and propagating the low-resolution QoS map and the environment information through a trained artificial deep neural network, wherein low-resolution QoS map and the environment information are provided as input parameters in an input section of the trained artificial deep neural network, and wherein the high-resolution QoS prediction map for the first radio communications network is provided in an output section of the trained artificial deep neural network.

According to an advantageous example, the method comprises: determining or providing measurement information characterizing at least one radio channel of the first radio communications network; and propagating the low-resolution QoS map, the environment information and the measurement information through the trained artificial deep neural network, wherein the low-resolution QoS map, the environment information and the measurement information are provided as the input parameters in the input section of the trained artificial deep neural network, and wherein the high-resolution QoS prediction map for the first radio communications network is provided in the output section of the trained artificial deep neural network.

According to an advantageous example, the method comprises operating the first radio communications network in dependence on the high-resolution QoS prediction map.

According to an advantageous example, the method comprises upscaling the low-resolution QoS map to an up-scaled representation.

According to an advantageous example, the method comprises determining a feature map in dependence on the up-scaled representation, wherein a corresponding feature extraction section comprises at least one skipping connection between layers of the feature extraction section.

According to an advantageous example, the method comprises determining the high-resolution prediction map in dependence on the feature map determined by the feature extraction section, wherein the convolutional section does not comprise skip connections between layers of the convolutional section.

According to an advantageous example, the method comprises: determining a randomized noise map comprising a plurality of randomized noise values, the determining comprising: determining a randomized low-resolution QoS map in dependence on the determined randomized noise map and in dependence on the low-resolution QoS map, and providing the randomized low-resolution QoS map to the trained artificial neural network.

According to a third aspect of the description, an apparatus for training a deep neural network comprises: a provisioning unit being configured to provide at least one training set, wherein the at least one training set ts) comprises a low-resolution QoS map associated with a radio communications network, a high-resolution QoS map associated with the radio communications network, and environment information characterizing the environment of the radio communications network; a determination unit being configured to propagate input data comprising the low-resolution QoS map and the environment information through the deep neural network, wherein the input data is provided as input parameter in an input section of the deep neural network, and wherein in an output section of the deep neural network at least one neural network based high-resolution QoS prediction map is provided; a discriminator unit being configured to determine a comparison by comparing the neural network based high-resolution QoS prediction map and the high-resolution QoS map of the training set; and a training unit being configured to train the deep neural network with the training set in dependence of the comparison.

The model is trained based on paired low-resolution and high-resolution maps together with a diverse set of input data describing the environment. Advantageously, the environment information assists the learning process, requesting a reduced number of training data samples, i.e., paired low- and high-resolution coverage measurements.

According to a fourth aspect of the description, a method for training a deep neural network is provided, wherein the method comprises: providing at least one training set, wherein the at least one training set ts) comprises a low-resolution QoS map associated with a radio communications network, a high-resolution QoS map associated with the radio communications network, and environment information characterizing the environment of the radio communications network; propagating input data comprising the low-resolution QoS map and the environment information through the deep neural network, wherein the input data is provided as input parameter in an input section of the deep neural network, and wherein in an output section of the deep neural network at least one neural network based high-resolution QoS prediction map is provided; determining a comparison by comparing the neural network based high-resolution QoS prediction map and the high-resolution QoS map of the training set; and training the deep neural network with the training set in dependence of the comparison.

DETAILED DESCRIPTION

Figure 1:
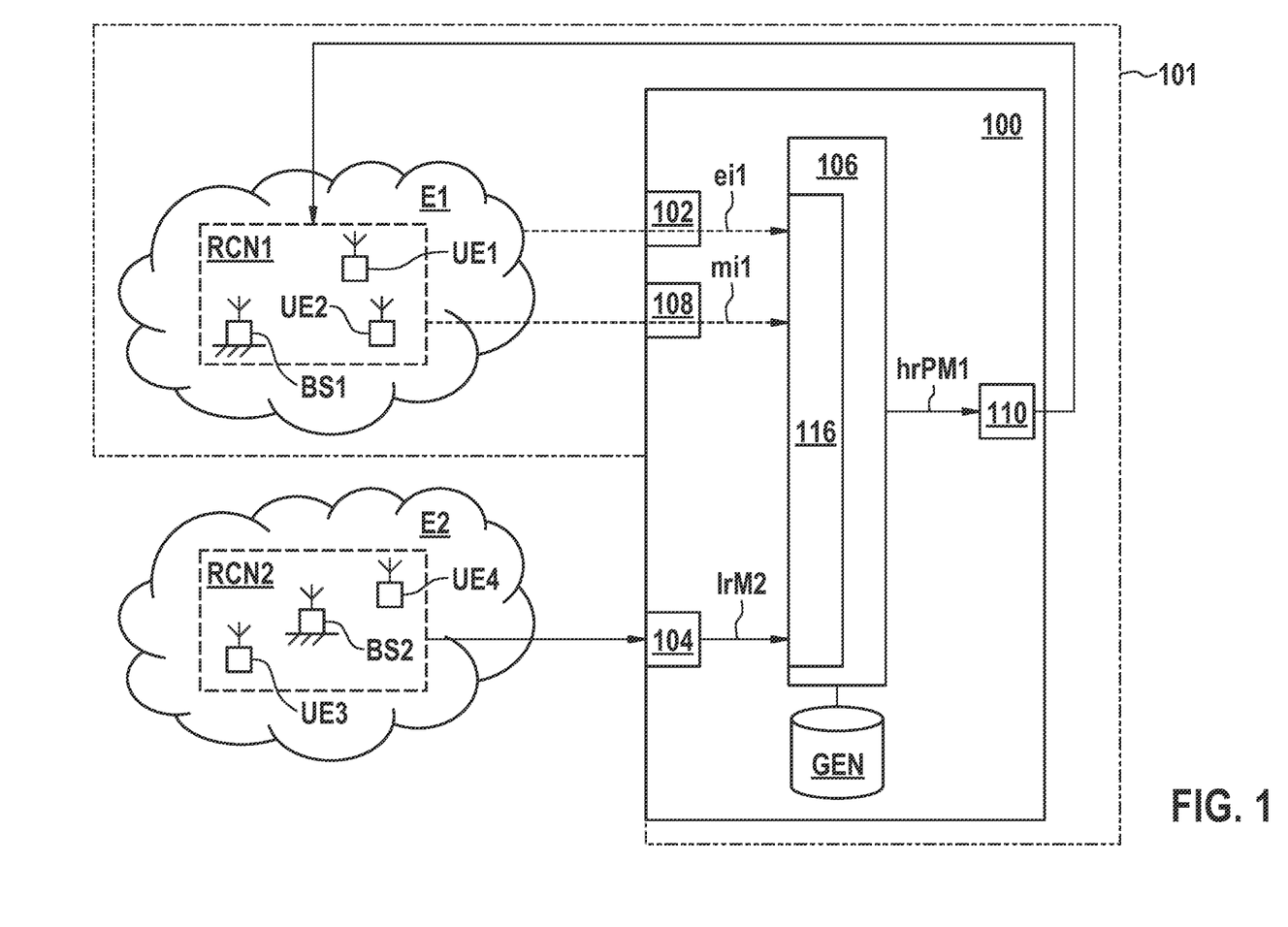
FIG. 1 depicts an apparatus for determining a high-resolution QoS prediction map.

FIG. 1 depicts schematically an apparatus 100 for determining a high-resolution QoS prediction map hrPM1 for a first radio communications network RCN1 of a first environment E1. A first input unit 102 is configured to determine or provide environment information ei1 characterizing the first environment E1. A second input 104 is configured to determine or provide a pre-determined low-resolution QoS map lrM2 associated with the first radio communications network RCN1 of the first environment E1 or associated with a second radio communications network RCN2 of a second environment E2.

The first environment E1 is the environment including the first radio communications network RCN1 with a base station BS1 and two user equipments UE1, UE2 under examination. Therefore, a block 101 constitutes the system at runtime. On the other hand, the second environment E2 and the second radio communications network RCN2, which comprises a base station BS2 and two user equipments UE3, UE4, represent a training set generation environment. So, the low-resolution QoS map lrM2 is provided in a pre-determined form.

A determination unit 106 is configured to propagate the pre-determined low-resolution QoS map lrM2 and the environment information ei1 through a trained artificial deep neural network GEN, wherein low-resolution QoS map lrM2 and the environment information ei1 are provided as input parameters in an input section of the trained artificial deep neural network GEN, and wherein the high-resolution QoS prediction map hrPM1 for the first radio communications network RNC1 is provided in an output section of the trained artificial deep neural network GEN.

The environment information ei1 is used as input to create more accurate maps of QoS predictions. The environment information ei1 includes maps with increasing detail levels e.g. used for automated driving purposes, high-resolution satellite images, information about building heights and potential further inputs like infrastructure-based video feeds or 3D-scans. Combined with base station locations and sample measurements, the correlation between the features and data rates are learned.

The high-resolution QoS prediction map provides a higher resolution at least on a 2-dimensional map scale than the low-resolution QoS map. In other words, the high-resolution QoS map provides more equidistant data points in an imaginary horizontal plane per map area than the low-resolution QoS map.

According to an example, the environment information ei1 comprises at least one of the following: High definition maps, Base station locations, Vehicle traffic flow information, Weather information like rain, humidity.

According to an example, the low-resolution QoS map and the high-resolution QoS prediction map comprise a same type of QoS parameter. According to another example, the low-resolution QoS map and the high-resolution QoS prediction map comprise different types of QoS parameter.

The type of QoS parameters comprises at least one of the following: data rate, packet delay, received/receivable signal strength, packet loss rate, spectrum occupancy, etc.

According to an example, the environmental information ei1 comprises a geographical map characterizing at least one non-transitory property of the environment at respective spatial positions. According to an example, the property is a color. The geographical map therefore could be a satellite photo indicating a color for each spatial position. According to another example, the geographic property is an altitude or height, for example, representing a height of a building.

In yet another example, the geographic property is a type of surface like metal, concrete, wood, grass or the like. The surface indicates the reflexing and absorption properties for radio waves.

According to an example, the environmental information ei1 comprises a traffic map characterizing at least one flow property of traffic at respective spatial positions indicated by the traffic map.

According to an example, the environmental information ei1 comprises a video stream or a perspective photographic representation of a part of the first environment E1.

According to an example, the environmental information ei1 comprises spatial positions of fixed antennas for serving the first radio communications network The at least one flow property comprises for example a number of vehicles or persons or UEs passing during a time period at the spatial position.

According to an example, the environmental information ei1 comprises a weather information characterizing at least one weather property for the first environment E1.

A third input unit 108 is configured to determine or provide measurement information mi1 characterizing at least one radio channel of the first radio communications network RCN1.

The determination unit 106 is configured to propagate the low-resolution QoS map lrM, the environment information ei1 and the measurement information mi1 through the trained artificial deep neural network GEN, wherein the low-resolution QoS map lrM, the environment information ei1 and the measurement information mi1 are provided as the input parameters in the input section of the trained artificial deep neural network GEN, and wherein the high-resolution QoS prediction map hrPM1 for the first radio communications network RCN1 is provided in the output section of the trained artificial deep neural network GEN.

According to an example, the measurement information mi1 comprises at least a plurality of radio measurements, for example of at least one radio parameter, wherein the respective radio measurement is associated with a spatial position or is associated with a spatial position and a time indicator. According to an example, the measurement information mi1 comprises at least one of: a network quality indicator like a UE-based signal strength measurements with location and time, or QoS parameters like sparse measurements of data rate with location and time.

An operating unit 110 is configured to operate the first radio communications network RCN1 in dependence on the high-resolution QoS prediction map hrPM1. For example, the operating unit 110 determines a certain area in the environment expected to be prone to a bad Quality of Service like low data rates. Before entering this area, the UEs are warned by a low data rate indicator in order to prepare the user plane functions to enter a safe operating state. According to another example, the network entities increase transmission power and/or select the most appropriate network(s) and/or disable at least one further application, if one of the communication partners resides in an area expected to be prone to low data rates.

A pre-processing unit 116 is configured to determine a randomized noise map comprising a plurality of randomized noise values. The pre-processing unit 116 is configured to determine a randomized low-resolution QoS map in dependence on the determined randomized noise map and in dependence on the pre-determined low-resolution QoS map lrM2. The pre-processing unit 116 is configured to provide the randomized low-resolution QoS map to the trained artificial neural network GEN instead of the un-randomized low-resolution QoS map lrM2.

According to another example, the pre-processing unit 116 is configured to pre-process the environment information ei1, for example collected measurements. A further machine-trained model decides how to do the pre-processing.

According to an example, instead of having a preprocessing unit 116, it could be enough to have lrM2 and a noise vector both as the inputs to GEN. Therefore, the preprocessing unit 116 is optional.

Figure 2:
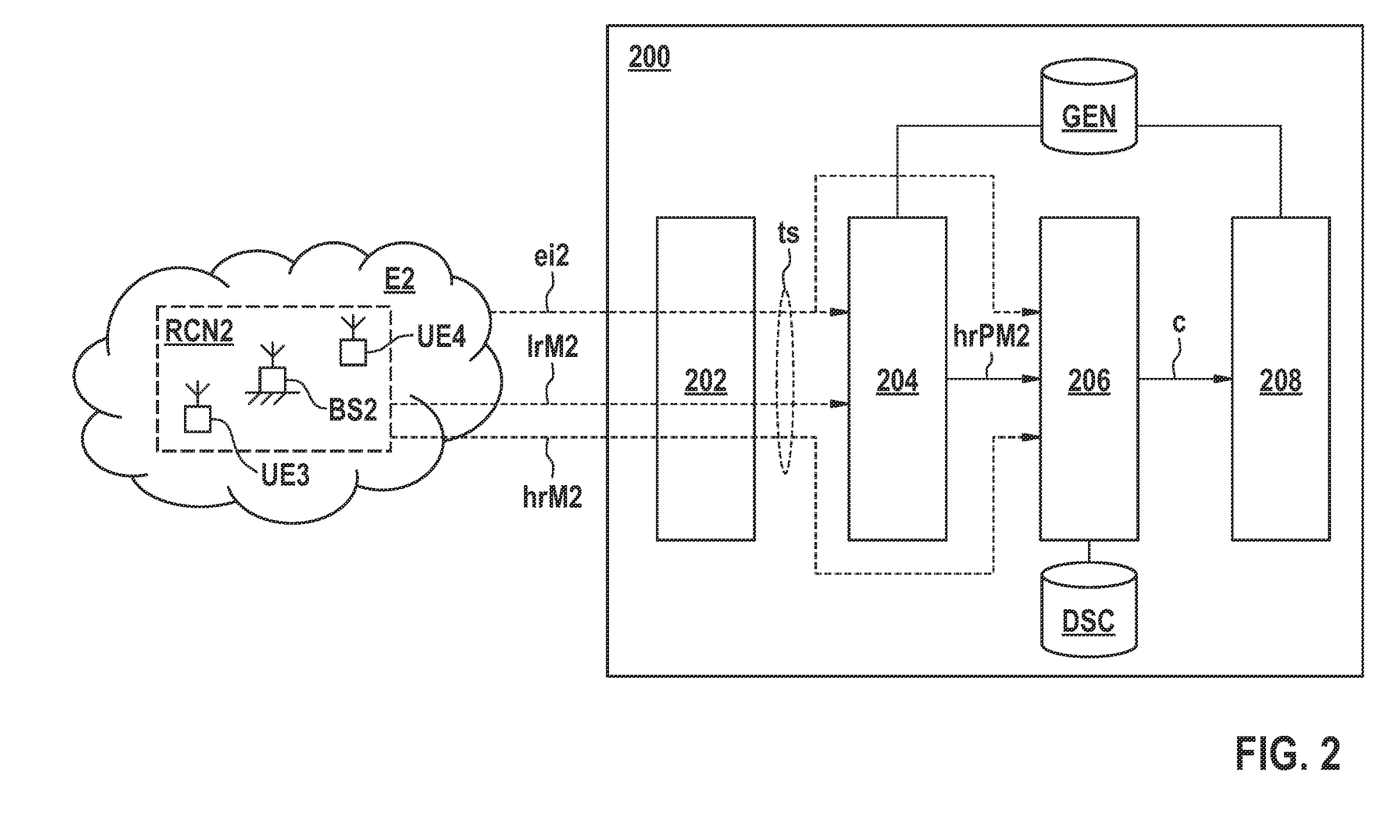
FIG. 2 depicts an apparatus for training an artificial neural network.

FIG. 2 depicts schematically an apparatus 200 for training the deep neural network GEN. A provisioning unit 202 is configured to provide at least one training set ts. The at least one training set ts comprises a low-resolution QoS map lrM2 associated with a radio communications network RCN2, a high-resolution QoS map hrM2 associated with the radio communications network RCN2, and environment information ei2 characterizing the environment E2 of the radio communications network RCN2.

A determination unit 204 is configured to propagate input data comprising the low-resolution QoS map lrM2 and the environment information ei2 through the deep neural network GEN. The input data is provided as input parameter in an input section of the deep neural network GEN. In an output section of the deep neural network GEN, at least one neural network based high-resolution QoS prediction map hrPM2 is provided.

A discriminator unit 206 is configured to determine a comparison c by comparing the neural network based high-resolution QoS prediction map hrPM2 and the high-resolution QoS map hrM2 of the training set ts. The discriminator unit 206 makes use of a trained deep neural network DSC. The neural networks GEN and DSC represent a generative adversarial network. The deep generator network GEN in combination with the discriminator network DSC produce higher resolution maps from low resolution ones. The training set ts consists of paired low-resolution and high-resolution maps. At the training phase, the generator network GEN takes in the low-resolution map of the region of the environment E2 and a random noise vector z together with the environmental information ei2 as a side input to generate the high-resolution map estimate of the same region. Here, the role of the random noise vector z is to create a stochastic relation between the low- and high-resolution maps.

The discriminator network DSC takes the high-resolution map as the input. It is trained to classify whether the input is generated or measured i.e., ground truth. The discriminator output in the sense of the comparison c is used as a reference signal for the generator network GEN to improve its output such that the discriminator network DSC fails to tell the generated and measured ones apart. This training process aims at letting the generator network GEN learn upscaling the low-resolution map.

According to an example, the conditional environment information ei2 is used. The discriminator DSC compares (hrPM2 and ei2) with (hrm2 and ei2). In addition to this comparison, hrPM2 is down-scaled and the down-scaled hrPM2 is compared with the real low-resolution QoS map lrM2.

A training unit 208 is configured to train the deep neural network GEN with the training set ts in dependence of the comparison c. For example, the training conducted by the training unit 208 is executed as exemplified to FIG. 6.

For translating, the generator network GEN takes in the low-resolution QoS map of the second radio communications network RCN2, a random noise z and the environment information ei2 associated with the second radio communications network RCN2. For example, the low-resolution QoS map and the random noise z are added element-wise/coordinate-wise. The output is fed into the discriminator network DSC that compares it against a measured high-resolution map of the region of the second radio communications network RCN2 and on the environment information ei2. In doing so, the generator network GEN learns translating the low-resolution map based on the side information. At test time, the generator network GEN is in use. With multiple draws of z, the generator network GEN is able to produce multiple high-resolution QoS prediction maps with the respect to the input low-resolution map.

According to an example, if pairs of the measured low-resolution QoS map and the measured high-resolution QoS map associated with the second radio communications network are determined over the time, a sequence of training sets with corresponding time stamps are generated over time. In doing so, the temporal information can be exploited.

Figure 3:
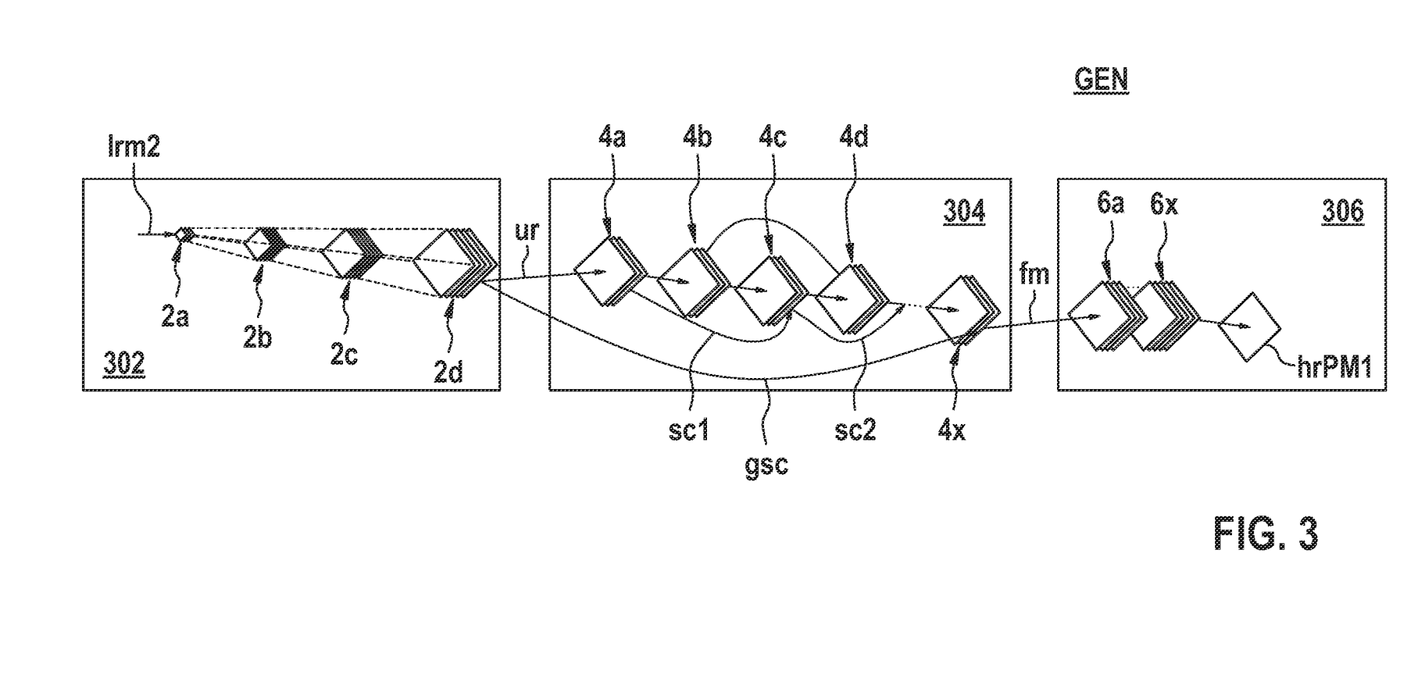
FIGS. 3 and 4 each depict a structure of an artificial deep neural network.

FIG. 3 depicts an exemplary structure of the neural network GEN. An upscaling section 302 is configured to upscale the low-resolution QoS map lrM2 to an up-scaled representation ur. The upscaling section 302 comprises a plurality of blocks 2a-2d, wherein the respective block 2a-2d comprises a 3D deconvolutional layer, followed by a batch normalization layer, followed by a Leaky ReLU activation layer, LReLU, followed by a 3D convolutional layer. Each 3D convolutional layer enhances the model representability. Each batch normalization layer normalizes the output and accelerates training. The LReLU layer improves the non-linearity of the model. The LReLU layer may take the form of LReLUx=x for x>=0 and LReLUx=ax for x<0, wherein x is the input and a is a positive constant like 0.05.

The neural network GEN comprises a feature extraction section 304, which configured to determine a feature map fm in dependence on the up-scaled representation ur, wherein the feature extraction section 304 comprises at least one skipping connection sc1, sc2, scG between layers of the feature extraction section 304.

The feature extraction section 304 comprises a plurality of feature extraction blocks 4a, 4b, 4c, 4d, . . . 4x. The respective feature extraction blocks 4a-x comprises a convolutional layer, a batch normalization layer and a Leaky ReLU activation layer. The respective feature extraction blocks 4a-x are interconnected by staggered skip connections sc1, sc2, which allows skipping of one or a plurality of subsequent feature extraction blocks 4b and 4c, or 4d, and a global skip connection gsc, which allows skipping of feature extraction section 304. The skip connections are shortcut connections and could be termed zipper connections.

A convolutional section 306 is configured to determine the high-resolution prediction map hrPM1 in dependence on the feature map fm determined by the feature extraction section 304, wherein the convolutional section 306 does not comprise skip connections between layers of the convolutional section 306. The convolutional section 306 comprises a plurality of blocks 6a to 6x without skip connections. The respective blocks 6a to 6x comprise a convolutional layer, followed by a batch normalization layer, and followed by a Leaky ReLU activation layer.

Figure 4:
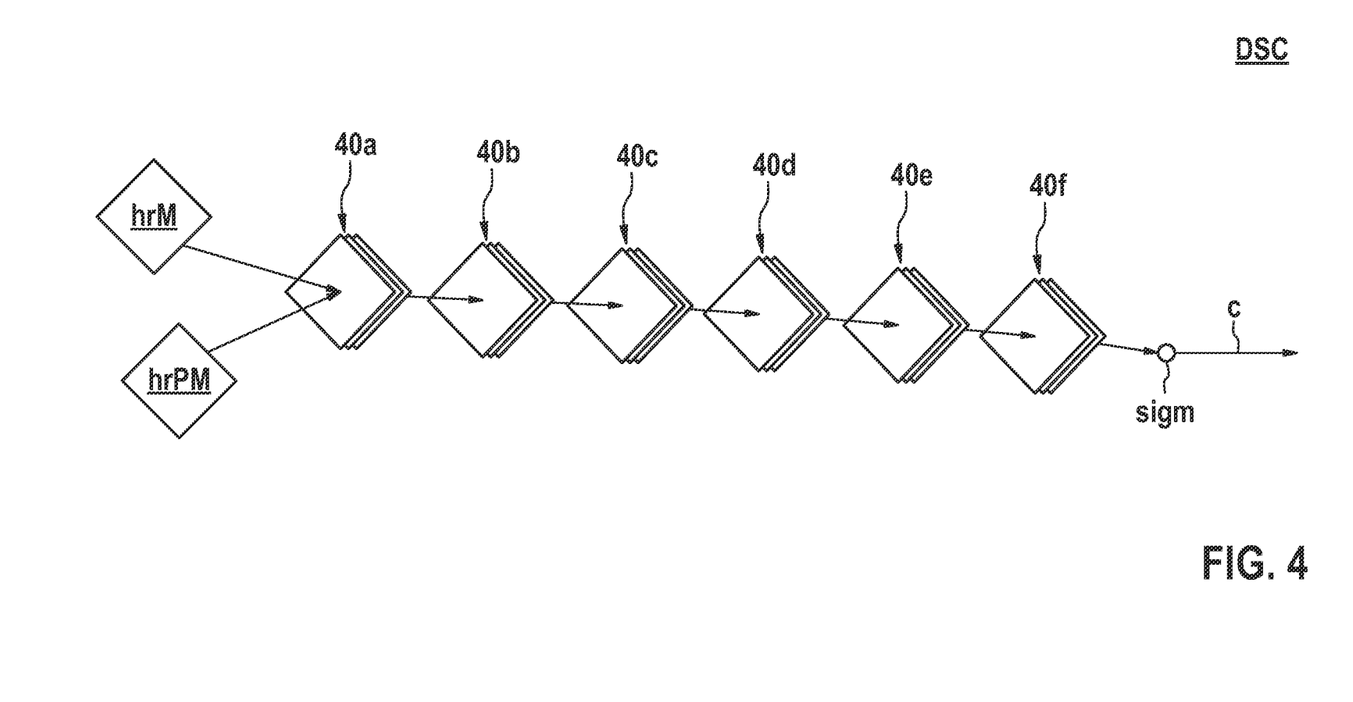

FIG. 4 depicts an example of a structure of a deep neural network DSC used as the discriminator. The deep neural network DSC determines the comparison c in form of an output of a Sigmoid function sigm in dependence on the high-resolution QoS prediction map hrPM of the network GEN according to one of the previous figures and in dependence on the high-resolution QoS map hrM determined via the real-life radio communications network. A respective one of the plurality of blocks 40a-40f comprises a convolutional layer, followed by a batch normalization layer, followed by a Leaky ReLU activation layer.

Figure 5:
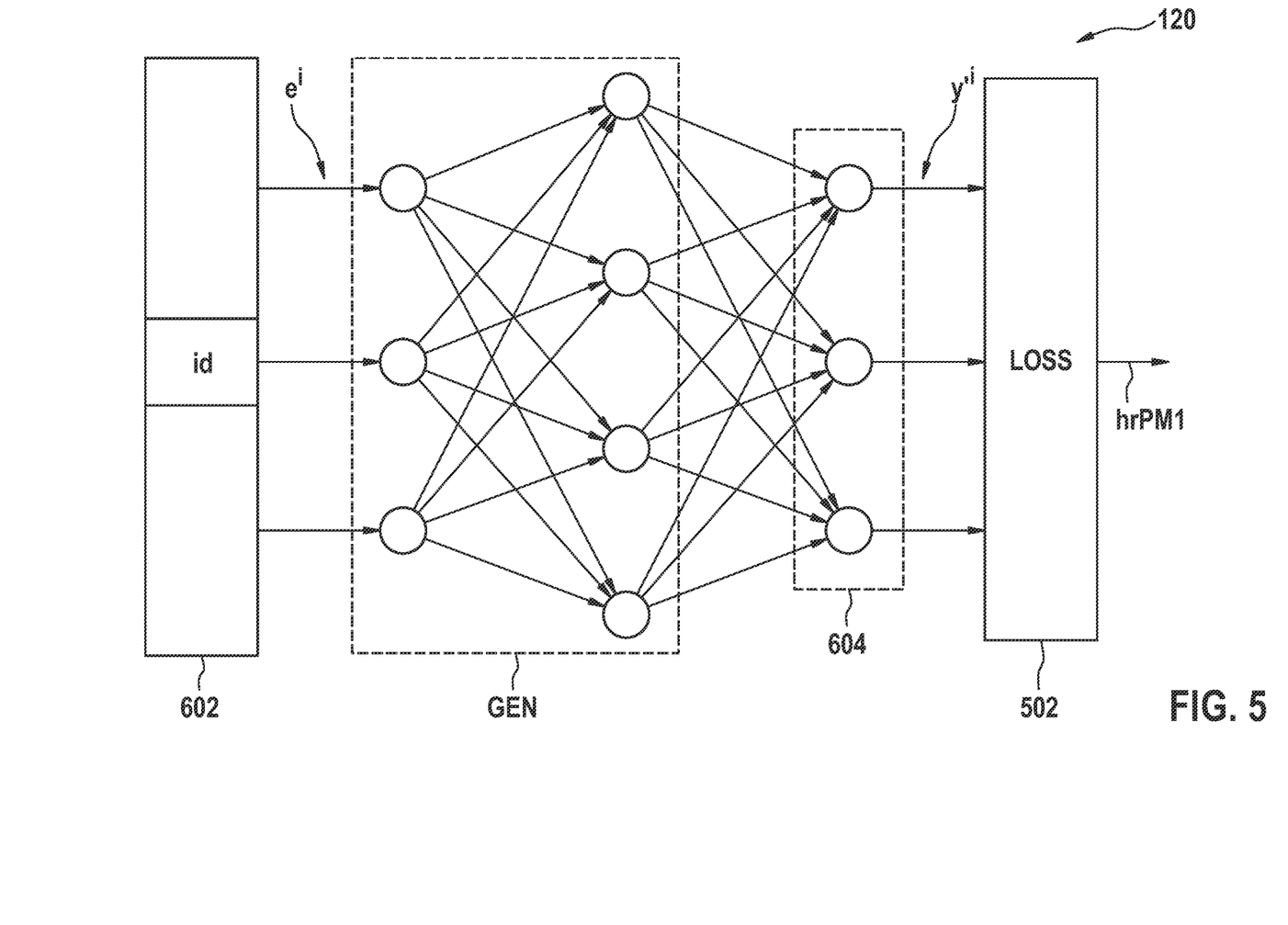
FIG. 5 depicts a schematic an arrangement for determining the high-resolution QoS prediction map.
Figure 6:
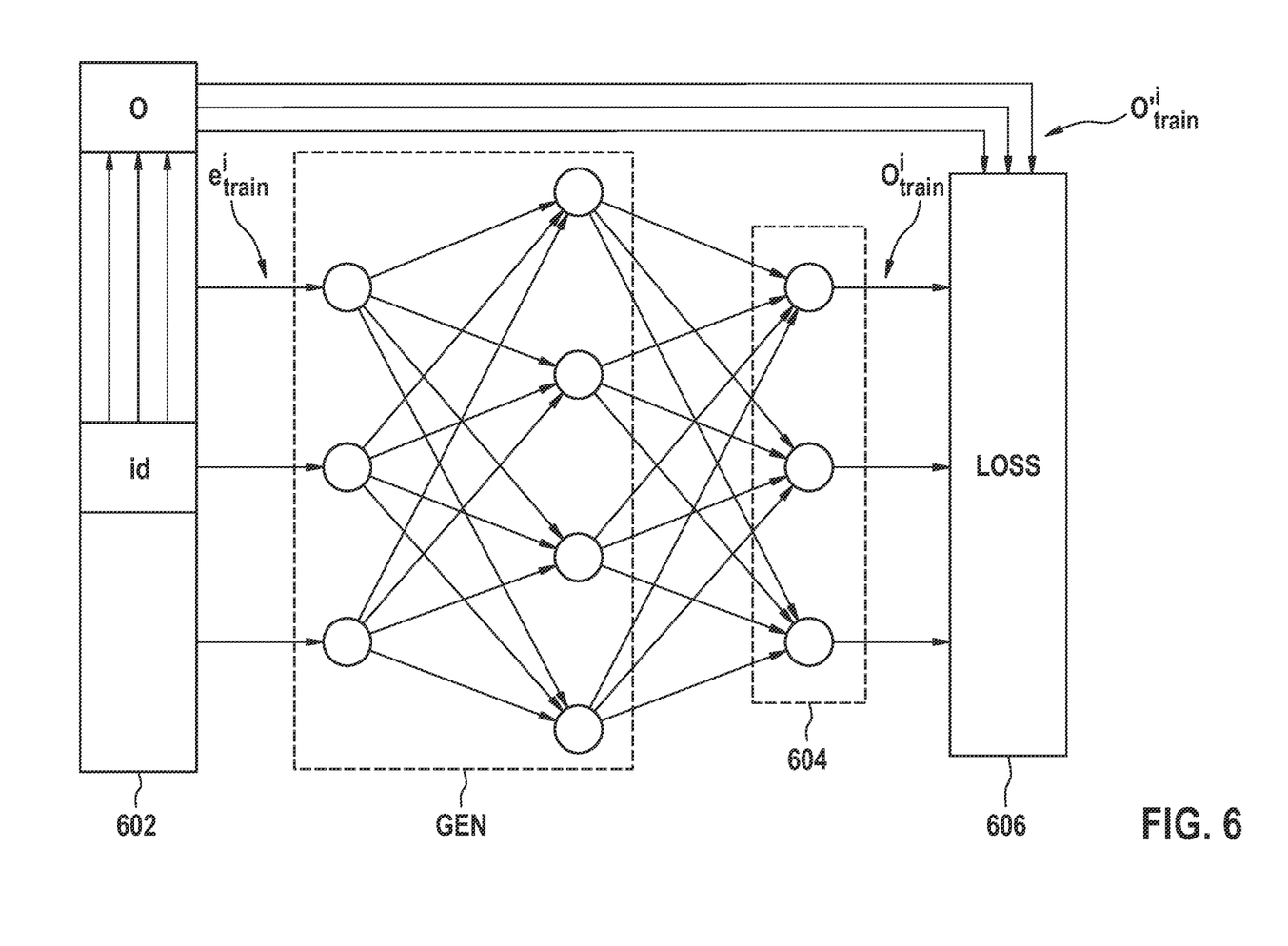
FIG. 6 depicts schematically an arrangement for training an artificial neural network.

FIG. 5 depicts a schematic arrangement for determining the high-resolution QoS prediction map hrPM1. An arrangement for the training is shown in FIG. 6. First, the training is referred to.

Training data eiTrain is provided in the form of input data by an input interface 602. The arrangement comprises the artificial neural network GEN with an input layer. For a time step i, an input tensor of the input data id is passed to the input layer. The input layer is part of the input section. For input data id, the output O is determined in the form of a prediction or is known beforehand. In time step i a tensor with observed values oitrain is determined from the output O, which are assigned to the observed values of the tensor eitrain. The output O comprises the QoS prediction map. Each of the time series of input data id is assigned to one of three input nodes. In a forward path of the artificial neural network GEN, the input layer is followed by at least one hidden layer. In the example, a number of nodes of the at least one hidden layer is greater than a number of the input nodes. This number is to be regarded as a hyper parameter. In the example, four nodes are provided in the hidden layer. The neural network GEN, for example, is learned by the gradient descent method in the form of backpropagation. The training of the neural network NN is therefore supervised.

In the forward path in the example, an output layer 604 is provided after at least one hidden layer. Prediction values are output at output layer 604 of the output section of the neural network GEN. In the example, an output node is assigned to each prediction value.

In each time step i a tensor o'itrain is determined in which the prediction values for this time step i are contained. In the example, this is fed to a training facility 606 together with the column vector of the observed values oitrain. The training device 606 is designed in the example to determine a prediction error by means of a loss function LOSS, in particular by means of a mean square error, and to train the model with it and by means of an optimizer, in particular an Adam optimizer. The loss function LOSS is determined in the example depending on a deviation, in particular the Mean Square Error, from the values of the tensor of the observed values o'itrain and the tensor of the prediction values oitrain.

The training is ended as soon as a fixed criterion is reached. In the example, the training is aborted if the loss does not decrease over several time steps, i.e. the Mean Square Error in particular does not decrease.

Test data is then entered into the model trained in this way. The model is generated by the training with the training data. The model is evaluated with the test data, in particular with regard to the mean value $\mu$ and covariance $\Sigma$.

According to the arrangement shown in FIG. 5, a trained model is used to provide the QoS prediction map. The same data preprocessing steps are performed as for the training data. For example, scaling and a determination of input and output data takes place. This determination takes place in the example during the operation of the apparatus 100 of FIG. 1, i.e. during the operation of the first radio communications network RCN1.

The input data are entered into the trained artificial neural network GEN. Depending on this, prediction values are determined. A determination score is determined depending on this.

FIG. 5 shows a schematic arrangement for determining the QoS prediction map. As described for the training, for a time step i a column vector ei is passed to the input layer for the input data id. The column vector is then passed to the input layer. Afterwards, in contrast to training, a determination device 502 determines the high-resolution QoS prediction map hrPM1 depending on the prediction values y'i.

In particular, instructions of a computer program implementing the described neural network GEN are provided for the implementation of the described procedures. Dedicated hardware can also be provided, in which a trained model is mapped.

Figure 7:
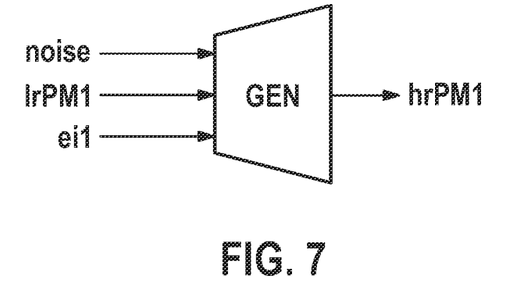
FIG. 7 depicts a trained artificial neural network.

FIG. 7 depicts the trained network GEN in a super-resolution mode. The trained network GEN maps the low-resolution QoS map lrPM1 to the high-resolution QoS map hrPM1 of the same network based on the provided environment information ei1 of the network. The mode super-resolution requires the training set to have paired examples, i.e., we have both low and high-resolution measurements of the same network. To train the super-resolution mode, we can add the mean square error between lrPM1 and downscale (hrPM1 generated by GEN) as the additional term to the training loss of the GEN. Basically, the GEN output after down-scaling, should be the same as the input lrPM1 for the super-resolution mode.

Figure 8:
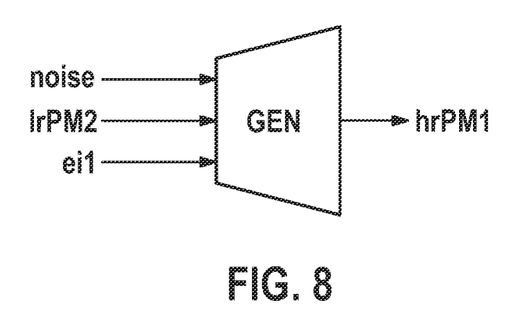
FIG. 8 depicts a trained artificial neural network.

FIG. 8 depicts the trained network GEN in a translation mode. The trained network GEN maps the low-resolution QoS map lrPM2 of a first network to a high-resolution QoS map hrPM1 of a second network based on the provided environment information ei1 of the second network. The mode translation involves the training set to have some low and high resolution measurements, they don't need to be paired. Additionally, we should know the environment map of high-resolution measurements. To train the translation mode, we can add the cycle consistency loss as the additional term to the training loss of the GEN. Basically, the GEN output can be mapped back to the low resolution lrM2 by a down-scale network, which is jointly trained with the translation network.

Also, to better perform translation task, it would be beneficial that the ei2 of lrPM2 shows some similarity of ei1, e.g., both are urban or rural areas. In short, the translation quality improves as ei2 and ei1 are closer to each other.

Figure 9:
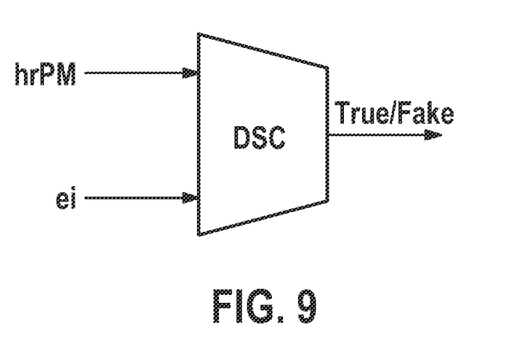
FIG. 9 depicts a trained network that is a discriminator acting as a binary classifier.

FIG. 9 depicts the trained network DSC that is a discriminator acting as a binary classifier. The output of the trained network DSC is true/fake based on the input. To train the network DSC, we can construct inputs as follows:

If the input comprises the high-resolution QoS map hrPM that is generated by the network GEN and the provided environment information, then the result is 'fake'.

If the input comprises the high-resolution QoS map hrPM that has been measured and the provided environment information, then the result is 'True'.

If the input comprises the high-resolution QoS map hrPM that has been measured and a wrong environment information ei, then the result is 'Fake'.

If the input comprises the high-resolution QoS map hrPM is generated by the trained network GEN and a wrong environment information ei, then the result is 'Fake'

Figure 10:
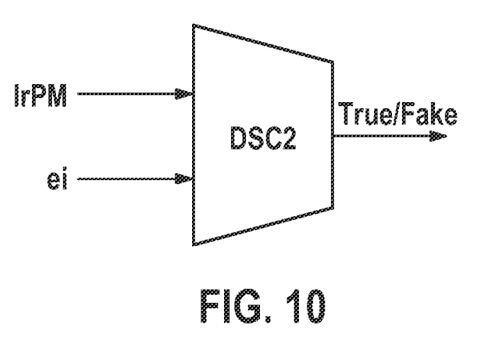
FIG. 10 depicts a trained network as a discriminator acting as a binary classifier.

FIG. 10 comprises a further trained network DSC2 as a further discriminator. To further enhance the training performance, the trained network DSC2 tells real/fake on the low-resolution QoS maps lrM. The trained network DSC2 is a binary classifier with output true/fake based on the input. To train the further network DSC2, we can construct inputs as follows:

Down-scale the high-resolution QoS map hrPM generated by the neural network GEN to a low-resolution QoS map lrPM and the corresponding environment information, then the result is 'Fake'.

If the input comprises a low-resolution QoS map lrPM that has been measured and the corresponding environment information ei, then the result is 'True'.

On the architecture side, the neural networks GEN and DSC can be deep neural networks, that comprise convolutional layers.

The invention claimed is:

1. An apparatus (100) for determining a high-resolution QoS prediction map (hrPM1) for a first radio communications network (RCN1) of a first environment (E1), wherein the apparatus (100) comprises:
 a first input unit (102) configured to determine or provide environment information (ei1) characterizing the first environment (E1);
 a second input (104) configured to determine or provide a low-resolution QoS map (lrM1; lrM2) associated with the first radio communications network (RCN1) of the first environment (E1) or associated with a second radio communications network (RCN2) of a second environment (E2); and
 a determination unit (106) configured to propagate the low-resolution QoS map (lrM1; lrM2) and the environment information (ei1) through a trained artificial deep neural network (GEN), wherein low-resolution QoS map (lrM1; lrM2) and the environment information (ei1) are provided as input parameters in an input section of the trained artificial deep neural network (GEN), and wherein the high-resolution QoS prediction map (hrPM1) for the first radio communications network (RNC1) is provided in an output section of the trained artificial deep neural network (GEN).

2. The apparatus (100) according to claim 1, comprising:
 a third input unit (108) configured to determine or provide measurement information (mi1) characterizing at least one radio channel of the first radio communications network (RCN1); and
 wherein the determination unit (106) is configured to propagate the low-resolution QoS map (lrM2), the environment information (ei1) and the measurement information (mi1) through the trained artificial deep neural network (GEN), wherein the low-resolution QoS map (lrM2), the environment information (ei1) and the measurement information (mi1) are provided as the input parameters in the input section of the trained artificial deep neural network (GEN), and wherein the high-resolution QoS prediction map (hrPM1) for the first radio communications network (RCN1) is provided in the output section of the trained artificial deep neural network (GEN).

3. The apparatus (100) according to claim 1 comprising:
 an operating unit (110) configured to operate the first radio communications network (RCN1) in dependence on the high-resolution QoS prediction map (hrPM1).

4. The apparatus (100) according to claim 1, wherein the trained neural network (GEN) comprises:
 an upscaling section (302) configured to upscale the low-resolution QoS map (lrM2) to an up-scaled representation (ur).

5. The apparatus (100) according to claim 1, wherein the determination unit (106) comprises
 a pre-processing unit (116) configured to determine a randomized noise map comprising a plurality of randomized noise values, configured to determine a randomized low-resolution QoS map in dependence on the determined randomized noise map and in dependence on the low-resolution QoS map (lrM2), and configured to provide the randomized low-resolution QoS map to the trained artificial neural network (GEN).

6. A method for determining a high-resolution QoS prediction map (hrPM1) for a first radio communications network (RCN1) of a first environment (E1), wherein the method comprises:
 determining or providing (102) environment information (ei1) characterizing the first environment (E1);
 determining or providing (104) a low-resolution QoS map (lrM1; lrM2) associated with the first radio communications network (RCN1) of the first environment (E1) or associated with a second radio communications network (RCN2) of a second environment (E2); and
 propagating (106) the low-resolution QoS map (lrM1; lrM2) and the environment information (ei1) through a trained artificial deep neural network (GEN), wherein low-resolution QoS map (lrM1; lrM2) and the environment information (ei1) are provided as input parameters in an input section of the trained artificial deep neural network (GEN), and wherein the high-resolution QoS prediction map (hrPM1) for the first radio communications network (RNC1) is provided in an output section of the trained artificial deep neural network (GEN).

7. The method according to claim 6, comprising:
 determining or providing (108) measurement information (mi1) characterizing at least one radio channel of the first radio communications network (RCN1); and
 propagating (106) the low-resolution QoS map (lrM1; lrM2), the environment information (ei1) and the measurement information (mi1) through the trained artificial deep neural network (GEN), wherein the low-resolution QoS map (lrM2), the environment information (ei1) and the measurement information (mi1) are provided as the input parameters in the input section of the trained artificial deep neural network (GEN), and wherein the high-resolution QoS prediction map (hrPM1) for the first radio communications network (RCN1) is provided in the output section of the trained artificial deep neural network (GEN).

8. The method according to claim 6 comprising:
 operating (110) the first radio communications network (RCN1) in dependence on the high-resolution QoS prediction map (hrPM1).

9. The method according to claim 6 comprising:
 upscaling (302) the low-resolution QoS map (lrM2) to an up-scaled representation (ur).

10. The method according to claim 6 comprising:
 determining (116) a randomized noise map comprising a plurality of randomized noise values, the determining (116) comprising: determining a randomized low-resolution QoS map in dependence on the determined randomized noise map and in dependence on the low-resolution QoS map (lrM2), and providing the randomized low-resolution QoS map to the trained artificial neural network (GEN).

11. An apparatus (200) for training a deep neural network (GEN), wherein the apparatus (200) comprises:
 a provisioning unit (202) being configured to provide at least one training set (ts), wherein the at least one training set ts) comprises a low-resolution QoS map (lrM2) associated with a radio communications network (RCN2), a high-resolution QoS map (hrM2) associated with the radio communications network (RCN2), and environment information (ei2) characterizing the environment (E2) of the radio communications network (RCN2);

a determination unit (204) being configured to propagate input data comprising the low-resolution QoS map (lrM2) and the environment information (ei2) through the deep neural network (GEN), wherein the input data is provided as input parameter in an input section of the deep neural network (GEN), and wherein in an output section of the deep neural network (GEN) at least one neural network based high-resolution QoS prediction map (hrPM2) is provided;

a discriminator unit (206) being configured to determine a comparison (c) by comparing the neural network based high-resolution QoS prediction map (hrPM2) and the high-resolution QoS map (hrM2) of the training set (ts); and a training unit (208) being configured to train the deep neural network (GEN) with the training set (ts) in dependence of the comparison (c).

12. A method for training a deep neural network (GEN), wherein the method comprises:

providing (202) at least one training set (ts), wherein the at least one training set ts) comprises a low-resolution QoS map (lrM2) associated with a radio communications network (RCN2), a high-resolution QoS map (hrM2) associated with the radio communications network (RCN2), and environment information (ei2) characterizing the environment (E2) of the radio communications network (RCN2);

propagating (204) input data comprising the low-resolution QoS map (lrM2) and the environment information (ei2) through the deep neural network (GEN), wherein the input data is provided as input parameter in an input section of the deep neural network (GEN), and wherein in an output section of the deep neural network (GEN) at least one neural network based high-resolution QoS prediction map (hrPM2) is provided;

determining (206) a comparison (c) by comparing the neural network based high-resolution QoS prediction map (hrPM2) and the high-resolution QoS map (hrM2) of the training set (ts); and training (208) the deep neural network (GEN) with the training set (ts) in dependence of the comparison (c).

* * * * *